United States Patent [19]

Kondo et al.

[11] 4,004,827
[45] Jan. 25, 1977

[54] GAS BAG SAFETY APPARATUS

[75] Inventors: Yutaka Kondo; Takashi Usugi, both of Toyota, Japan

[73] Assignee: Toyota Jidosha Kogyo Kabushiki Kaisha, Toyota, Japan

[22] Filed: Sept. 23, 1975

[21] Appl. No.: 615,919

[30] Foreign Application Priority Data
Apr. 8, 1975 Japan .............................. 50-42621

[52] U.S. Cl. .............................. 280/742; 280/729; 280/743

[51] Int. Cl.² .............................. B60R 21/08

[58] Field of Search ............ 280/150 AB, 729, 742, 280/743; 244/31; 137/525.1

[56] References Cited
UNITED STATES PATENTS

| 3,573,885 | 4/1971 | Brawn | 280/150 AB |
|---|---|---|---|
| 3,622,176 | 11/1971 | Byer | 280/150 AB |
| 3,767,225 | 10/1973 | Mazelsky | 280/150 AB |
| 3,788,665 | 1/1974 | Noll et al. | 280/150 AB |
| 3,810,654 | 5/1974 | De Bano et al. | 280/150 AB |

Primary Examiner—Kenneth H. Betts
Attorney, Agent, or Firm—Stevens, Davis, Miller & Mosher

[57] ABSTRACT

A gas bag safety apparatus comprises an inflatable torso bag installed within the compartment of a vehicle, a gas-diffuser assembled within the torso bag and having a number of jet holes to supply pressurized gas fluid into the torso bag from an external gas pressure source, and an inflatable knee bag housed within the torso bag and mounted on a portion of the diffuser through a check valve to be inflated by the pressurized gas fluid supplied from the diffuser, the check valve being provided on the opening end of the knee bag to be opened into the knee bag. The valve seat portion of the check valve is at least double-layered to reinforce a portion of the knee bag exposed to the jet holes.

2 Claims, 18 Drawing Figures

7a

7b

7c

7d

7e

7f

8a

8b

8c

8d

8e

8f

GAS BAG SAFETY APPARATUS

BACKGROUND OF THE INVENTION

The present invention relates to a gas bag safety apparatus to be installed within the compartment of a vehicle to protect the occupants, and more particularly to an improvement of a gas bag safety apparatus of the type including a torso bag and a knee bag respectively to protect the occupant's body and knees.

In a conventional gas bag safety apparatus of this kind, a torso bag of a large capacity is provided therein with a gas-diffuser to supply pressurized gas fluid thereto and includes a small capacity knee bag to be inflated by the gas fluid from the diffuser. The gas-diffuser has a number of jet holes provided thereon along the longitudinal direction and the knee bag is mounted on a portion of the diffuser jet holes by way of an inwardly opening check valve. Thus, the knee bag is inflated simultaneously with the torso bag when pressurized gas fluid jets out from the diffuser. With this gas bag safety apparatus, as the pressurized gas fluid strikes directly a portion of the knee bag which is exposed to the diffuser jet holes, if the exposed portion is single-layered, heated particles or dusts discharged from the jet holes together with the gas fluid will damage the knee bag to reduce or lose the impact energy absorbing effect of the knee bag.

SUMMARY OF THE INVENTION

The primary object of the present invention is, therefore, to provide a gas bag safety apparatus including a knee bag which is designed to resist the heated particles so as to maintain its expected impact energy absorbing effect.

A further object of the present invention is to provide a gas bag safety apparatus, having the above-mentioned characteristics, wherein the knee bag includes a check valve of which the valve seat portion is at least double-layered to reinforce such a portion of the bag as directly exposed to the jet holes of a diffuser.

Another object of the present invention is to provide a seaming method for making a multi-layered valve seat portion of a check valve to be attached to a knee bag.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
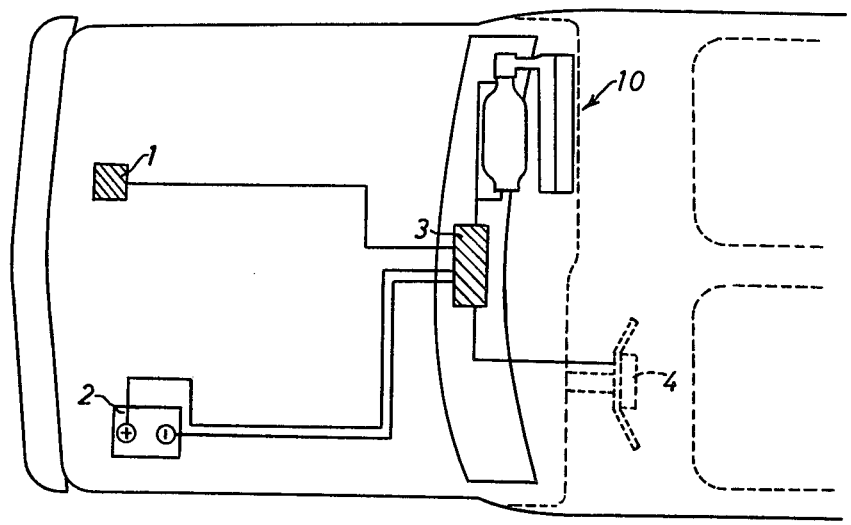
FIG. 1 is a schematic illustration of an automotive vehicle equipped with a gas bag safety apparatus according to the present invention.

Referring now to the drawings, particularly to FIG. 1, a gas bag safety apparatus 10 is schematically illustrated in association with an automotive vehicle. A collision sensor 1 is provided for detecting the occurrence of vehicle collision, and connected to an electric control circuit 3 for actuating the gas bag safety apparatus 10 in response to the signal from the sensor 1. The control circuit 3 is connected to an electric source 2 which is the prime battery of the vehicle. A collapsed gas bag assembly 4 is mounted on the steering assembly and operated in response to the signal from the collision sensor 1.

Figure 2:
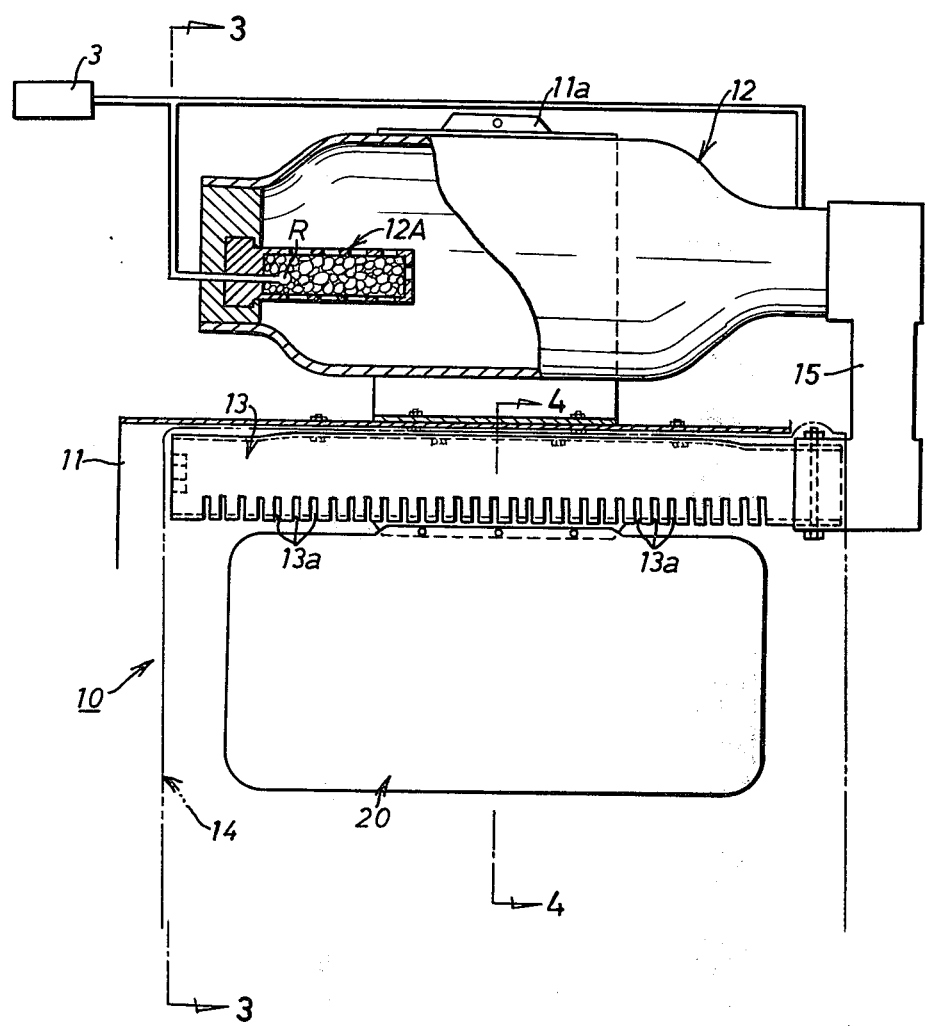
FIG. 2 is an enlarged cross-sectional view of the gas bag safety apparatus shown in FIG. 1.
Figure 3:
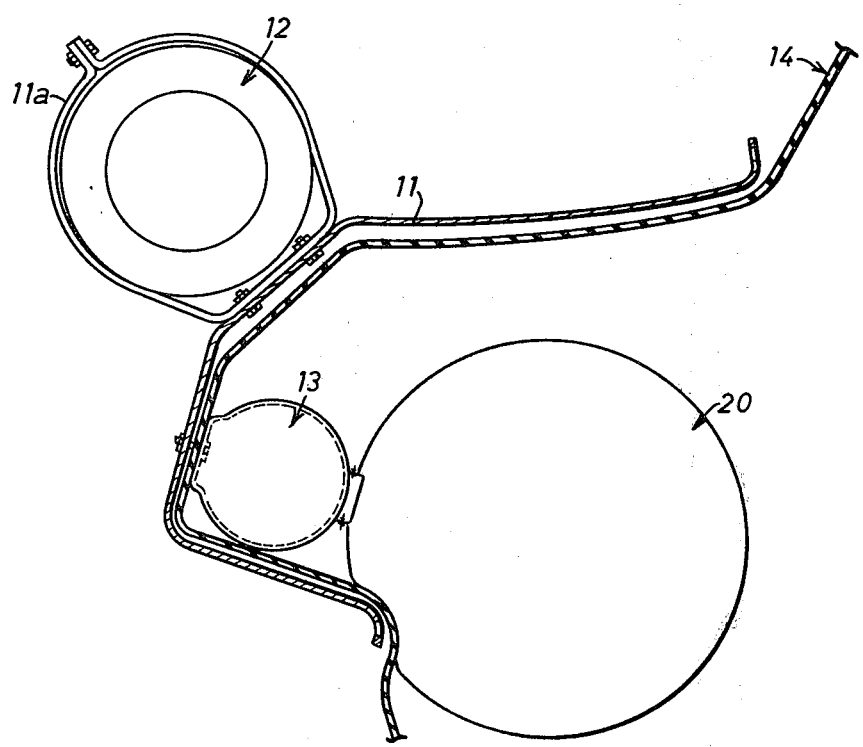
FIG. 3 shows a vertical section taken along the line 3—3 of FIG. 2.

As best shown in FIGS. 2 and 3, the gas bag safety apparatus 10 comprises a mounting panel 11 fixedly mounted on the bottom side of an instrument panel (not shown) of the vehicle, a gas charger assembly 12 mounted on the backside of the mounting panel 11 by way of a band 11a, and a diffuser 13 fixed at the front portion of the mounting panel 11. The safety apparatus 10 further comprises an inflatable torso bag 14 of large capacity which is mounted in an air-tight manner on the mounting panel 11 at its opening end and contains therein the diffuser 13 and an inflatable knee bag 20 which is contained within the torso bag 14 and of which the opening end is mounted on a portion of jet holes 13a of the diffuser 13.

The gas charger assembly 12 is a conventional hybrid gas supply device which contains therein compressed gas and includes an explosive means 12A to be activated by a primer R upon detonation thereof when electric energy is given thereto. The discharge nozzle of the gas charger assembly 12 is connected to the diffuser 13 by way of a valve (not shown) and a conduit 15. The diffuser 13 is closed at the top end thereof and provided longitudinally at its front face with a number of jet slits 13a opening toward the interior of the torso bag 14.

Figure 4:
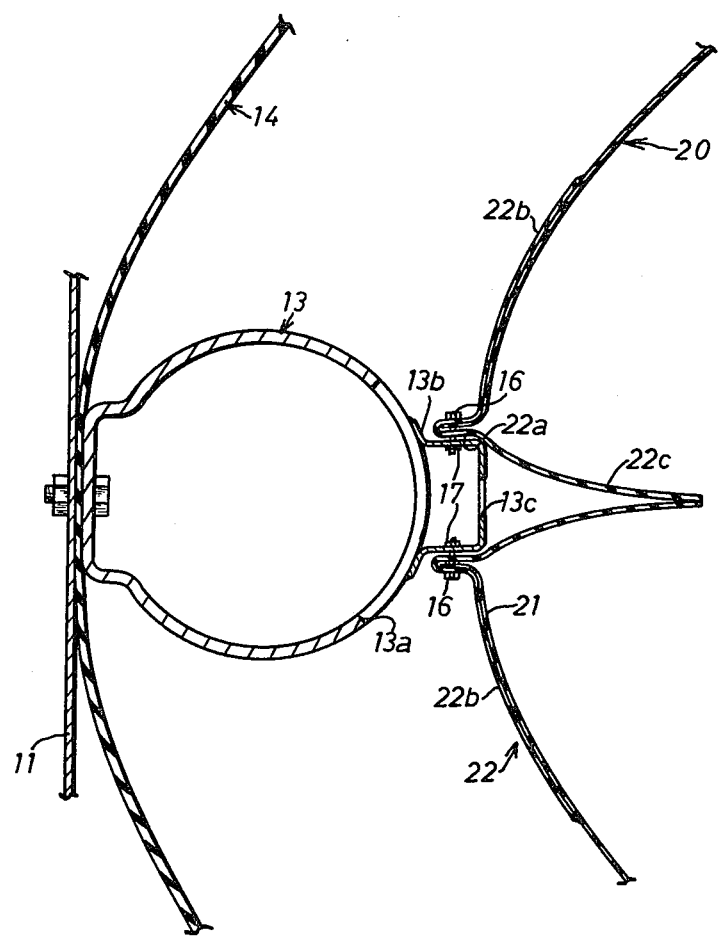
FIG. 4 shows an enlarged vertical section taken along the line 4—4 of FIG. 2.
Figure 5:
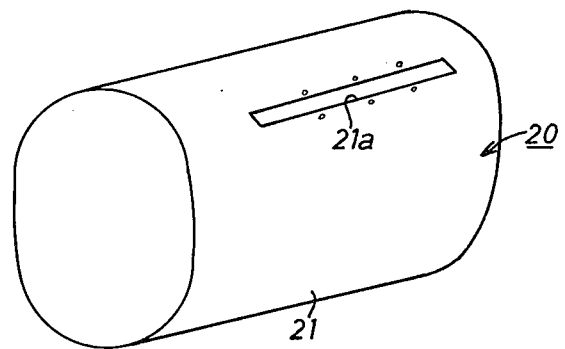
FIG. 5 is a perspective view of a knee bag shown in FIG. 2.
Figure 6:
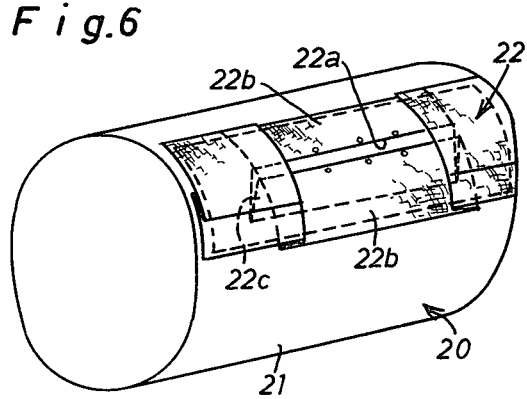
FIG. 6 depicts a check valve attached to the knee bag shown in FIG. 5.

As best shown in FIGS. 5 and 6, the knee bag 20 comprises a body 21 seamed to be inflatable into a drum shape, including a slit opening 21a. A check valve 22 is stitched around the slit opening 21a. The portions adjacent to the both sides of the valve opening 22a of the check valve 22 are, as well shown in FIG. 4, firmly mounted by bolts 16 and nuts 17 on a bracket 13b having a U-shaped cross-section and welded on the central portion of the diffuser 13, thereby to enable the knee bag 20 to be inflated in front of the diffuser 13. A number of holes 13c opening toward the interior of the knee bag 20 are transversely provided at the front side of the bracket 13b. With the knee bag 20 constructed and assembled as mentioned, the portion exposed directly to the jet slits 13a of the diffuser 13 is reinforced by a valve seat portion 22b of the check valve 22. A pair of valve portions 22c integrally formed with the valve seat portion 22b are designed and arranged only to open inwardly.

Figure 7:
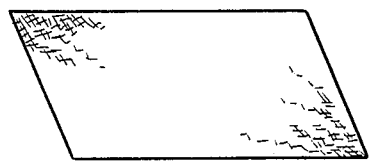
FIG. 7, which includes views 7a–7f, illustrates the steps of a seaming method for the check valve shown in FIG. 6.
Figure 7:
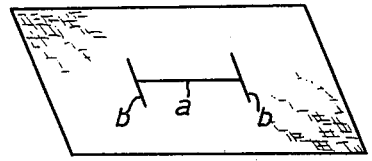
Figure 7:
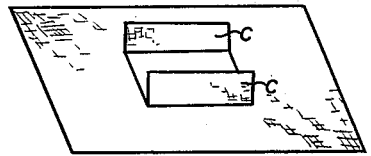
Figure 7:
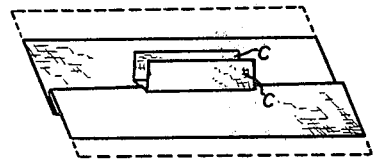
Figure 7:
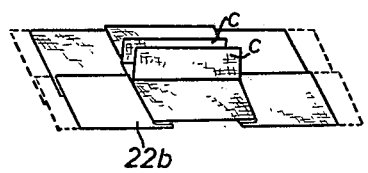
Figure 7:
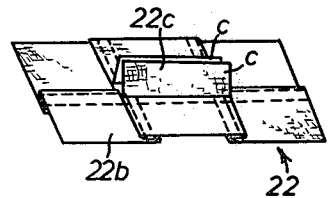

Now reference is made to FIG. 7 for a seaming method for the check valve 22. In carrying out the method illustrated in FIGS. 7a, 7b, 7c, 7d, 7e and 7f of FIG. 7, an oblong sheet of the gas bag material (FIG. 7a) is handled as follows. First, as shown in FIG. 7b, a transverse cut a is made on the central portion of the sheet and two cuts b are also made in parallel to each other respectively at each end of the cut a. These cuts a and b provide a pair of flaps c, c which are folded outwardly as seen in FIG. 7c. The next step is to fold the sheet, as illustrated in FIG. 7d, at its substantial transverse center along the folded lines for the flaps c, c to make a three layers, thereby to have the flaps c, c to be adjacent to each other. FIG. 7e shows the next step to fold the sheet at each side of the flaps c, c inwardly. As shown in FIG. 7f, all the folded portions are at both of their sides joined by seams shown in dotted lines. Now referring again to FIG. 6, a pair of valve portions 22c formed by the flaps c, c are inserted into the valve opening 21a of the knee bag body 21 and the valve seat portion 22b is stitched integrally on the outside of the body 21.

Figure 8:
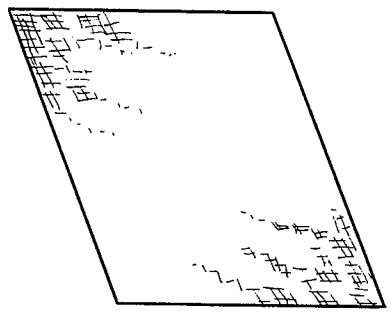
FIG. 8, which includes views 8a–8f, illustrates the steps of another seaming method for the check valve shown in FIG. 6.
Figure 8:
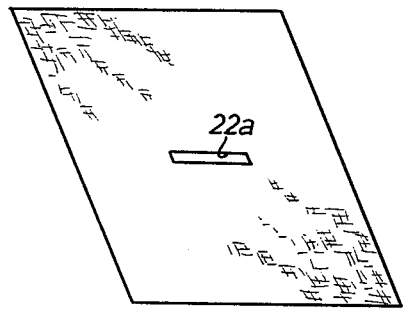
Figure 8:
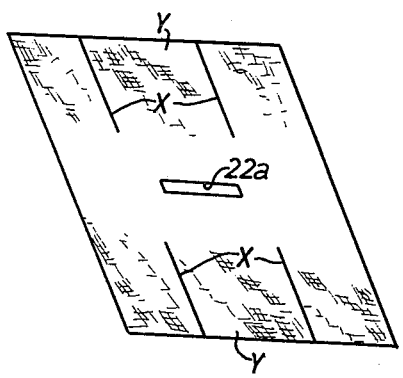
Figure 8:
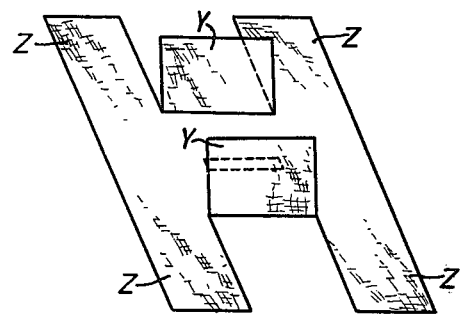
Figure 8:
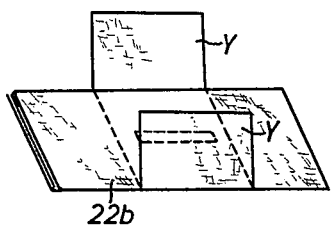
Figure 8:
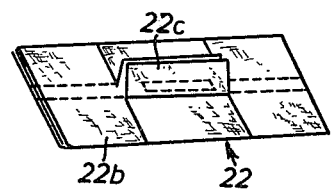

FIG. 8 illustrates another seaming method for the check valve 22. In carrying out the method shown in FIGS. 8a, 8b, 8c, 8d, 8e and 8f of FIG. 8, an oblong sheet of the gas bag material (FIG. 8a) is first provided with a slit as the valve opening 22a at the central portion thereof (FIG. 8b). FIG. 8c shows the next step to make two pairs of parallel cuts x, x to form a pair of flaps Y, Y. Then, as seen in FIG. 8d, the flaps Y, Y are folded up outwardly. The remained portions Z—Z are folded down inwardly along the folded lines of the flaps Y, Y to make a three-layered valve seat portion 22b (FIG. 8e). As shown in FIG. 8f, the flaps Y, Y are folded outwardly to have the folded lines correspond with the both sides of the valve opening 22a so as to form a pair of valve portions 22c. All the free ends of the folded portions are seamed. Then, the valve portions 22c are inserted into the opening 21a of the knee bag body 21 shown in FIG. 5, and the valve seat portion 22b is integrally stitched on the outside of the body 21.

Described below in detail is the operation of the gas bag safety apparatus constructed as above-explained. The torso bag 14 and the knee bag 20 are normally collapsed around the diffuser 13 and contained compactly in a space under the instrument panel of the vehicle. In case occurrence of a vehicle collision, the collision is detected by the sensor 1 which generates a signal. In response to this signal, the valve means (not shown) of the gas charger assembly 12 opens instantly to release the compressed gas within the gas charger assembly 12. Then, the released gas fluid jets out from the jet slits 13a of the diffuser 13 by way of the conduit 15. Simultaneously, the primer R is electrically energized to activate the explosive means 12A. Detonation of the explosive means 12A produces instantly a large amount of gas which also jets out from the jet slits 13a of the diffuser 13. As a result, as best shown in FIGS. 2, 3 and 4, the torso bag 14 is inflated to protect the occupant's body and at the same time within the inflated torso bag 14, the knee bag 20 is also inflated to protect the occupant's knees.

In the above operation, when the gas explosively produced by detonation (of the explosive means 12A) jets out from the jet slits 13a of the diffuser 13, heated particles or dust strike directly and damage the valve seat portion 22b of the knee bag 20 while in the inflating process. With the knee bag 22 constructed in accordance with the present invention, however the valve seat portion 22b is multi-layered. Thus, the surface layer may be damaged, but the inflation and the energy absorbing effect of the knee bag 20 is satisfactorily secured as designed.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A seaming method for a check valve for an inflatable knee bag to be assembled within an inflatable torso bag of a gas bag safety apparatus comprising the steps of
    providing a transverse cut on the central portion of a rectangular sheet of the gas bag material;
    further providing two cuts in parallel to each other respectively at each end of the transverse cut to form a pair of flaps;
    folding the respective flaps outwardly to form a pair of valve portions;
    further folding the sheet at the transverse center along the folded lines of the flaps to have the folded flaps to be adjacent to each other; and
    seaming all the folded sheet portions to form a valve seat portion for the valve portions.

2. A seaming method for a check valve for an inflatable knee bag to be assembled within an inflatable torso bag of a gas bag safety apparatus comprising the steps of
    providing a valve opening on the central portion of a rectangular sheet of the gas bag material;
    making two pairs of parallel cuts at both sides of the valve opening to form a pair of flaps;
    folding the respective flaps outwardly and the remaining portions inwardly along the folded lines of the flaps to form three layers;
    further folding the flaps outwardly to have the folded lines corresponding with the opening end of the valve opening so as to form a pair of valve portions; and
    seaming all the folded portions to form a valve seat portion for the valve portions.

* * * * *